Oct. 20, 1953  M. F. ARMELIN  2,655,817
MECHANISM FOR CONVERTING A UNIFORM
MOTION INTO A VARIABLE MOTION
Filed April 3, 1951  3 Sheets-Sheet 1

Inventor
Maurice François Armelin
By Robert E. Burns
Attorney

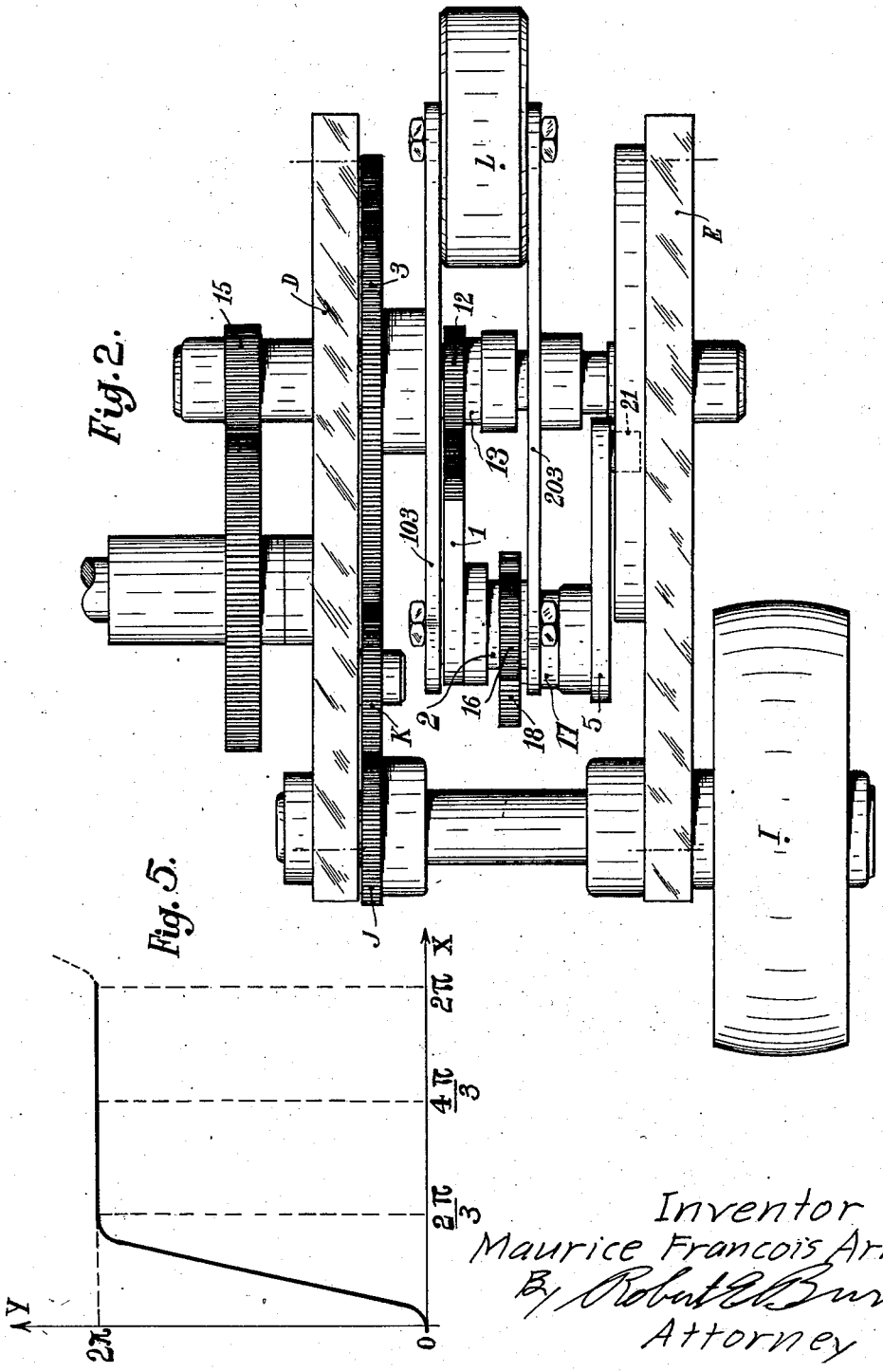

Oct. 20, 1953

M. F. ARMELIN 2,655,817

MECHANISM FOR CONVERTING A UNIFORM MOTION INTO A VARIABLE MOTION

Filed April 3, 1951

Inventor
Maurice François Armelin
By Robert E Burns
Attorney

Patented Oct. 20, 1953

2,655,817

UNITED STATES PATENT OFFICE 2,655,817

MECHANISM FOR CONVERTING A UNIFORM MOTION INTO A VARIABLE MOTION

Maurice François Armelin, Paris, France, assignor to Société à Responsabilité Limitée so called: Societe d'Etudes de Machines Speciales, Paris, France Application April 3, 1951, Serial No. 219,099
In France April 7, 1950

4 Claims. (Cl. 74—394)

Mechanisms are already known whereby a uniform motion can be converted into a variable motion and are described in the U. S. Patent Ser. No. 2,535,774, granted to the applicant. By means of such mechanisms variable motions can be obtained, amongst which such as include short stops of the driven member.

My invention aims at improving mechanisms of the kind just referred to with a view to obtain a wider range of variable motions and more particularly such motions in which the time for which the driven member is stopped can be adjusted as desired relative to the time for which it is running.

According to the aforementioned patent the mechanism comprised a planet wheel the axis of which was eccentric relative to an axis common to a driving wheel and to a driven central pinion, which planet wheel was in meshing engagement with said driven pinion and mounted on a rotary support provided by the said wheel. The planet wheel was rocked to and fro by means of a rod adapted both to slide and rock about a pin which could be set in a desired fixed position or which could be varied in its position by means of a cam device.

In some instances the planet wheel and the central pinion in said mechanism might be limited to toothed sectors.

A first improvement according to my invention consists in that the planet wheel is rocked relative to the rotary support of the same by means of a member pivoted to said support and the outline of which during the rotation of said support is kept tangent to a cam mounted in the frame of the mechanism.

Preferably, the said pivoted member is an arm provided with a follower cooperating with a fixed cam.

The cam may be so designed that the motion of the driven member includes standstill periods the duration of which bears a predetermined ration to the duration of the working periods.

The cam may also be so designed that the motion of the driven member includes periods of backward movement.

A further improvement, which may or not be combined with the one just set forth consists in actuating the planet wheel from the pivoted member through a gear set.

Preferably, said gear set is of the step-up kind, which makes it possible to rock the planetary wheel through an angle just as large by means of a shorter pivoted member.

At least one wheel of such a gear set may be limited simply to a toothed sector.

A third improvement resides in the fact that a planet wheel carrying member rigid with the driving wheel is used instead of the driving wheel itself to provide the rotary support of the planet wheel.

Still a further improvement consists in offsetting the want of balance resulting from the presence of the planet wheel carrying member by the provision of a counterweight.

A preferred embodiment of a mechanism according to my invention will now be described in which the various improvements set forth are combined and in which the fixed cam is designed with a view to convert a uniform rotary motion into an intermittent rotary motion, the times for which the mechanism is at standstill being double those for which it is in operation, reference being had to the drawing appended hereto, in which:

Figure 2 is a corresponding top plan view.

Figure 5 is a diagram of the rotational movement obtained.

Figure 1:
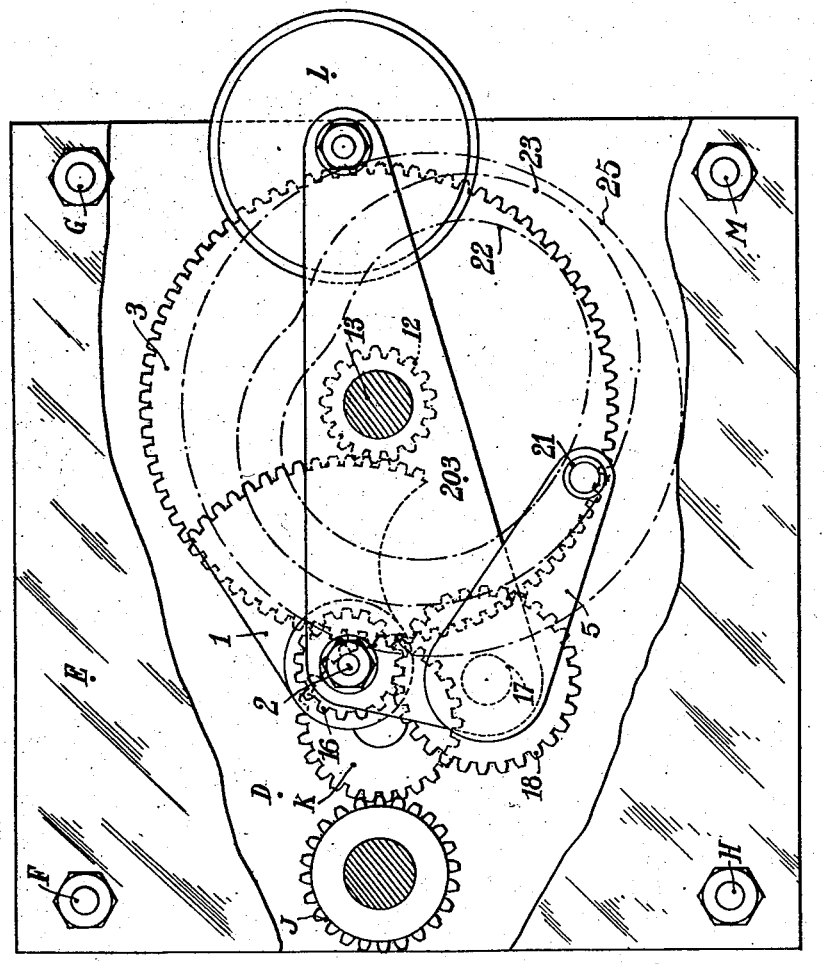
Figure 1 is a general front view of the device, one of the side plates of its casing being partly broken away.

The frame of the mechanism consists of a pair of parallel side plates D, E braced to each other by means of tie bolts F, G, H, M.

1 designates the so-called planet gear wheel which here is limited to a sector.

2 designates the shaft of said sector.

3 designates the driving gear wheel of the mechanism.

5 denotes the rocking member which here is an arm which carries a follower pin.

The driving wheel is rotated from a pulley I through a gear train J, K.

Rigid with the driving wheel are a pair of cheeks 103, 203 which provide the rotatable support in which the shaft 2 of the planet sector is mounted. The weight of this planet sector and of arm 5 is balanced by means of a counterweight L which at the same time acts as a distance piece between the said cheeks.

Meshing with said sector I is a driven central pinion 12 which is keyed on a shaft 13 mounted in the aforementioned side plates D, E and on which is likewise keyed a gear wheel 15 through which the motion of the central pinion 12 is transmitted to a power-consuming mechanism.

The rigid system composed of the wheel 3 and the cheeks 103, 203 is a composite driving-member, which is rotatably mounted on said shaft 13.

Keyed on shaft 2 which carries the sector I as already stated is also a pinion 16. Mounted in said cheeks 103, 203 parallel with shaft 2 is a shaft 17 which, in addition to the aforesaid arm 5, carries a pinion 18 meshing with said pinion 16, both of them being located on the other side of the cheek 203. Said arm 5 carries a follower pin 21 engaged in a cam groove 22—23 milled in the inside of the frame side plate E or in a plate rigid therewith.

As the revoluble support 103—203 and the parts carried thereby are revolved by the combined action of pulley I, gear wheels J, K and driving wheel 3 the arm 5 is rocked about the axis of shaft 17 with respect to said revoluble support owing to the cooperation of the follower on said arm 5 with the fixed cam groove 22, 23. Through the medium of the gear set 18—16 such a deflection of the arm 5 is amplified and transmitted to the sector 1. The central pinion 12 is imparted with an absolute rotational movement which is the resultant of the rotational movement of the driving wheel 3 and associated parts 103, 203 and of the relative angular displacement transmitted by the sector 1. The said resultant movement is governed notably by the design of the fixed cam groove 22—23.

Numerical data relating to a mechanism adapted to convert a continuous circular movement into an intermittent circular movement in which the duration of the standstill periods exceeds twice that of the working periods are given hereinafter for the purpose of exemplification yet by no means of limitation.

*Example*

| | |
|---|---|
| Number of teeth of a hypothetically complete planet wheel | 80 |
| Actual number of teeth of planet sector 1 | 17 |
| Number of teeth of the sector-actuating pinion 16 | 21 |
| Number of teeth of pinion 18 | 35 |
| Effective length of arm 5 mm | 94 |
| Interaxial distance 17—13 mm | 115 |
| Diameter of follower 21 mm | 18 |

The polar coordinates of the inner wall of the cam groove 22—23 as seen in Fig. 1 are given hereinafter, the polar centre being the axis of shaft 13, the angles being reckoned clockwise from the upper side of a vertical through said axis.

| Angles, degrees | Radii, mm. | Angles, degrees | Radii, mm. |
|---|---|---|---|
| 0 | 37.0 | 180 | 81.5 |
| 15 | 33.0 | 193 | 78.0 |
| 30 | 30.5 | 210 | 74.5 |
| 45 | 28.0 | 225 | 70.5 |
| 60 | 29.0 | 240 | 66.5 |
| 75 | 35.0 | 255 | 63.0 |
| 90 | 50.0 | 270 | 59.5 |
| 105 | 64.0 | 285 | 56.0 |
| 120 | 76.5 | 300 | 52.0 |
| 135 | 84.5 | 315 | 48.0 |
| 150 | 88.0 | 330 | 44.5 |
| 165 | 85.0 | 345 | 41.0 |
| 180 | 81.5 | 360 | 37.0 |

Fig. 5 represents the diagram of the movement obtained in this manner. The angular displacements of the driving wheel 3 are plotted as abscissae and those of the driven central pinion 12 as ordinates. Movement is only transmitted to the latter for one third of the time the driving wheel 3 accomplishes a full revolution and remains standstill for the two other thirds of this time.

The mechanism thus described can quite advantageously be used instead of Geneva motions, in which the ratios of the stops to the running times as well as the laws of motion are predetermined and invariable. Effectively, with the mechanism according to my invention, by properly designing the cam groove, it is very easy to obtain any desired ratio between the stops and the running times as well as any desired law of movement, notably extremely mild starts and stops, owing to which the speed can be increased.

It remains within the scope of the invention to substitute the follower-carrying oscillating arm 5 by any other member held in cooperative engagement with a camming member rigid with the frame of the mechanism.

Figure 3:
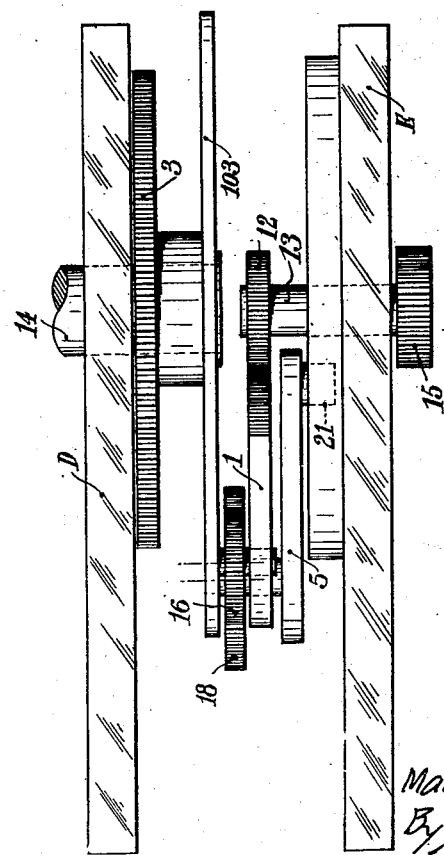

It is to be pointed out that the sector 1 need not mesh with pinion 12 between a pair of cheeks 103, 203 rigid with the driving wheel, since one of said cheeks could be dispensed with as shown in Fig. 3. Likewise, the members 3 and 103 rigid with each other need not be mounted for rotational movement on the shaft 13 on which the central pinion 12 and the gear wheel 15 are keyed, since the said parts 3, 203 might as well be keyed on a shaft 14 coaxial with shaft 13 as shown in said Fig. 3.

Figure 4:
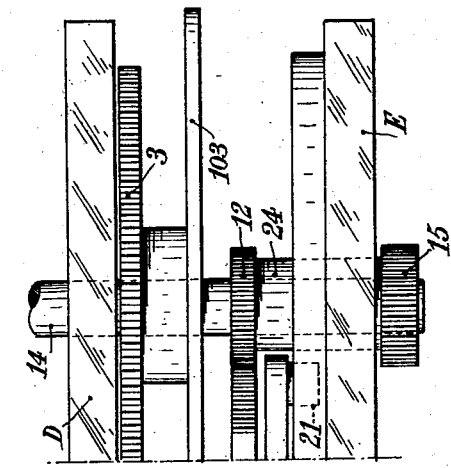
Figures 3 and 4 are similar plan views of modifications.

It also remains within the scope of my invention to use a shaft 14 rigid with members 3 and 103 and mounted at its one end in the side plate D and at its opposite end in a socket 24 which in its turn is mounted in the side plate E and by which the wheel 15 is rigidly interconnected with the central pinion as shown in Fig. 4.

What I claim is:

1. A mechanism for the conversion of a uniform rotational motion into an algebraically variable motion which comprises a frame, a composite driving member rotatably mounted in said frame, a toothed driven member rotatably mounted relative to and coaxial with said driving member, a toothed planet member carried by said composite driving member eccentric to the axis of the same and in mesh with said driven member, a gear connected with said planet member, an arm pivoted on said composite driving member about an axis which is out of centre with respect to the axis of said driving member, and having a gear connected thereto, said arm being adapted to displace said planet member angularly by means of said gears, a follower on said arm, and a fixed cam on the frame for said follower.

2. A mechanism for the conversion of a uniform rotational motion into an algebraically variable motion which comprises a frame, a composite driving member rotatably mounted in said frame, a toothed driven member rotatably mounted relative to and coaxial with said driving member, a toothed planet member carried by said composite driving member eccentric to the axis of the same and in mesh with said driven member, a gear connected with said planet member, an arm pivoted on said composite driving member about an axis which is out of centre with respect to the axis of said driving member, and having a gear connected thereto, said arm being adapted to displace said planet member angularly by means of said gears, a follower on said arm, a fixed cam on the frame for said follower adapted by design to cause swinging motion of said arm and said planet member with regard to the driving member and to thus cause standstills of the driven member in mesh with said planet member.

3. A mechanism for the conversion of a uniform rotational motion into an algebraically variable motion which comprises a frame, a composite driving member rotatably mounted in said frame, a toothed driven member rotatably mounted relative to and coaxial with said driving member, a toothed planet member carried by said composite driving member eccentric to the axis of the same and in mesh with said driven member, a toothed member coaxial and rigid with said toothed planet member for the actuation of the same, a step-up toothed member pivoted on the driving member eccentric to the axis of said driving member and meshing with said toothed member for the actution of the same, an arm rigid with said step-up toothed member, a fixed cam on the frame of the mechanism and a follower on said arm cooperating with said fixed cam.

4. A mechanism for the conversion of a uniform rotational motion into an algebraically variable motion which comprises a frame, a composite driving member rotatably mounted in said frame, a toothed driven member rotatably mounted relative to and coaxial with said driving member, a toothed planet member carried by said composite driving member eccentric to the axis of the same and in mesh with said driven member, a gear connected with said planet member, an arm pivoted on said composite driving member about an axis which is out of centre with respect to the axis of said driving member and having a gear connected thereto, said arm being adapted to displace said planet member angularly by means of said gears, a counterweight of the planet member and of the arm on said composite driving member, a fixed cam on the frame of the mechanism and a follower on said arm cooperating with said cam.

MAURICE FRANÇOIS ARMELIN.

References Cited in the file of this patent
UNITED STATES PATENTS

| Number | Name | Date |
|---|---|---|
| 841,443 | Richards | Jan. 15, 1907 |
| 2,253,367 | Di Prima | Aug. 19, 1941 |
| 2,309,595 | James | Jan. 26, 1943 |
| 2,498,036 | Grace | Feb. 21, 1950 |
| 2,536,754 | Dudley et al. | Jan. 2, 1951 |